US012772282B2

(12) United States Patent
Saber et al.

(10) Patent No.: US 12,772,282 B2
(45) Date of Patent: Oct. 20, 2026

(54) SYSTEM AND METHOD FOR MULTIPLEXING UPLINK CHANNELS

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 17/709,311

(22) Filed: Mar. 30, 2022

(65) Prior Publication Data

US 2022/0353881 A1 Nov. 3, 2022

Related U.S. Application Data

(60) Provisional application No. 63/186,691, filed on May 10, 2021, provisional application No. 63/182,395, filed on Apr. 30, 2021.

(51) Int. Cl.
*H04W 72/566* (2023.01)
*H04L 1/1812* (2023.01)
(Continued)

(52) U.S. Cl.
CPC ......... *H04W 72/569* (2023.01); *H04L 1/1812* (2013.01); *H04L 5/0051* (2013.01); *H04L 5/0053* (2013.01); *H04W 72/1263* (2013.01)

(58) Field of Classification Search
CPC ....... H04W 4/06; H04W 76/19; H04W 76/20; H04W 80/02; H04W 76/40; H04L 1/08;
(Continued)

(56) References Cited

U.S. PATENT DOCUMENTS

| | | | |
|---|---|---|---|
| 10,506,569 | B2 | 12/2019 | Papasakellariou et al. |
| 10,856,271 | B2 | 12/2020 | Papasakellariou et al. |

(Continued)

FOREIGN PATENT DOCUMENTS

| | | | |
|---|---|---|---|
| CN | 111726206 | A | 9/2020 |
| KR | 10-2020-0091861 | A | 7/2020 |

(Continued)

OTHER PUBLICATIONS

Intel Coproration: "Further analysis and details of intra-UE multiplexing and prioritization," R1-2103030, 3rd Generation Partnership Project (3GPP), Apr. 2021, 21 pages, Retrieved from the Internet: URL:https://ftp.3gpp.org/tsg_ran/WG1_RL1/TSGR1_104b-e/Docs/R1-2103030.zip.

(Continued)

*Primary Examiner* — Jung H Park
(74) *Attorney, Agent, or Firm* — Womble Bond Dickinson (US) LLP

(57) ABSTRACT

A system and method for multiplexing uplink communications. In some embodiments, the method includes: multiplexing, by a User Equipment (UE) a Low Priority (LP) Hybrid Automatic Repeat Request acknowledgment (HARQ-ACK) codebook and a High Priority (HP) HARQ-ACK codebook in a first Physical Uplink Shared Channel (PUSCH), the multiplexing including mapping the HP HARQ-ACK codebook after a first symbol that follows a Demodulation Reference Signal (DMRS) and that does not include any DMRS Resource Elements (REs).

20 Claims, 11 Drawing Sheets

(51) Int. Cl.
*H04L 5/00* (2006.01)
*H04W 72/1263* (2023.01)

(58) Field of Classification Search
CPC ... H04L 1/1822; H04L 1/1861; H04L 1/1832; H04L 2001/0093
See application file for complete search history.

(56) References Cited

U.S. PATENT DOCUMENTS

| | | | | |
|---|---|---|---|---|
| 10,856,272 | B2 | 12/2020 | Papasakellariou et al. | |
| 2020/0367265 | A1 | 11/2020 | Wang et al. | |
| 2021/0259006 | A1 | 8/2021 | Yoshioka et al. | |
| 2021/0337579 | A1 | 10/2021 | Choi et al. | |
| 2022/0330234 | A1* | 10/2022 | Yang | H04W 72/56 |
| 2023/0284227 | A1* | 9/2023 | Choi | H04L 1/1861 370/329 |
| 2023/0412324 | A1* | 12/2023 | Bhamri | H04L 1/1854 |
| 2024/0107574 | A1* | 3/2024 | Yamamoto | H04L 1/1812 |

FOREIGN PATENT DOCUMENTS

| | | | |
|---|---|---|---|
| WO | 2020/197338 | A1 | 10/2020 |
| WO | 2020/202068 | A1 | 10/2020 |

OTHER PUBLICATIONS

Nokia et al.: "On UL intra-UE prioritization and multiplexing enhancements," R1-2008843, 3rd Generation Partnership Project (3GPP), Oct. 2020, 20 pages, Retrieved from the Internet: URL:https://ftp.3gpp.org/tsg_ran/WG1_RL1/TSGR1_103-e/Docs/R1-2008843.zip.

EPO Extended European Search Report dated Sep. 22, 2022, issued in the corresponding European Application No. 22167561.4 (11 pages).

Taiwanese Office Action corresponding to TW Application No. 111116483, dated Nov. 12, 2025 (19 pages).

Korean Office Action corresponding to KR Application No. 10-2022-0050149, dated Jul. 21, 2026 (6 pages).

* cited by examiner

| ACK Length ≤ 2 | ACK Length > 2 |
|---|---|
| ***Step 1: Find the REs and reserve them***<br><br>***Step 2: Do nothing***<br><br>***Step 3:***<br>○ **Map CSI-part1 to the remaining REs (number of available REs must > number of reserved REs for ACK)**<br>○ **Map CSI-part2 to the remaining REs**<br><br>***Step 4: Map UL-SCH data bits to remaining REs as many as possible starting from the first bit***<br><br>***Step 5: Map ACK bits on the reserved REs (previously filled by UL-SCH data bits starting from the first bit)*** | ***Step 1: Do nothing***<br><br>***Step 2: Map ACK bits to the REs***<br><br>***Step 3:***<br>○ **Map CSI-part1 to the remaining REs**<br>○ **Map CSI-part2 to the remaining REs**<br><br>***Step 4: Map UL-SCH data bits to remaining REs as many as possible starting from the first bit***<br><br>***Step 5: Do nothing*** |

FIG. 2

| **Channel** | **Priority** |
| --- | --- |
| DG-PUSCH | 1-bit indicator in scheduling DCI format 0-1,0-2 |
| CG-PUSCH | 2-level priority via RRC in the configured grant information element (IE) |
| PUCCH | PUCCH priority is defined according the carried UCI:<br>• **SR**: Each SR resource configuration via RRC is configured with a 2-level priority<br>• **CSI**: P-CSI and SP-CSI are considered to be low priority. Aperiodic CSI (A-CSI) is carried in PUSCH and its priority is the priority of the PUSCH.<br>• **HARQ-ACK**: The priority of HARQ-ACK PUCCH is that of the corresponding PDSCH. A 2-level priority is defined for PDSCH. |

FIG. 4A

TS 28.213

A PUSCH or a PUCCH transmission, including repetitions if any, can be of priority index 0 or of priority index 1. For a configured grant PUSCH transmission, a UE determines a priority index from *phy-PriorityIndex*, if provided. For a PUCCH transmission with HARQ-ACK information corresponding to a SPS PDSCH reception or a SPS PDSCH release, a UE determines a priority index from *harq-CodebookID*, if provided. For a PUCCH transmission with SR, a UE determines the corresponding priority as described in Clause 9.2.4. For a PUSCH transmission with semi-persistent CSI report, a UE determines a priority index from a priority indicator field, if provided, in a DCI format that activates the semi-persistent CSI report. If a priority index is not provided to a UE for a PUSCH or a PUCCH transmission, the priority index is 0.

If a UE is provided two *PUCCH-Config*

- if the UE is provided *subslotLengthForPUCCH* in the first *PUCCH-Config*, the PUCCH resource for any SR configuration with priority index 0 or any CSI report configuration in any *PUCCH-Config* is within the *subslotLengthForPUCCH* symbols in the first *PUCCH-Config*

- if the UE is provided *subslotLengthForPUCCH* in the second *PUCCH-Config*, the PUCCH resource for any SR configuration with priority index 1 in any *PUCCH-Config* is within the *subslotLengthForPUCCH* symbols in the second *PUCCH-Config*

FIG. 4B

TS 38.213

A UE does not expect a PUCCH resource that results from multiplexing overlapped PUCCH resources, if applicable, to overlap with more than one PUSCHs if each of the more than one PUSCHs includes aperiodic CSI reports.

If a UE transmits multiple PUSCHs in a slot on respective serving cells that include first PUSCHs that are scheduled by DCI format(s) 0_0 or DCI format(s) 0_1 and second PUSCHs configured by respective *ConfiguredGrantConfig* or *semiPersistentOnPUSCH*, and the UE would multiplex UCI in one of the multiple PUSCHs, and the multiple PUSCHs fulfil the conditions in Clause 9.2.5 for UCI multiplexing, the UE multiplexes the UCI in a PUSCH from the first PUSCHs.

If a UE transmits multiple PUSCHs in a slot on respective serving cells and the UE would multiplex UCI in one of the multiple PUSCHs and the UE does not multiplex aperiodic CSI in any of the multiple PUSCHs, the UE multiplexes the UCI in a PUSCH of the serving cell with the smallest *ServCellIndex* subject to the conditions in Clause 9.2.5 for UCI multiplexing being fulfilled. If the UE transmits more than one PUSCHs in the slot on the serving cell with the smallest *ServCellIndex* that fulfil the conditions in Clause 9.2.5 for UCI multiplexing, the UE multiplexes the UCI in the earliest PUSCH that the UE transmits in the slot.

FIG. 5

- For UCI multiplexing, within a PUCCH group, on PUSCH, the following two steps are performed with step 1 first, then followed by step 2:
  - Step 1: UCI in overlapped PUCCH transmissions is multiplexed into one PUCCH resource (resource Z). This step is done per PUCCH slot.
  - Step 2: UCI, that doesn't include SR, in Z is multiplexed into one PUSCH, if Z overlaps with at least one PUSCH, following the priorities (sequentially from high to low) as listed below.
    - First priority: PUSCH with A-CSI as long as it overlaps with Z
    - Second priority: earliest PUSCH slot(s) based on the start of the slot(s)
    - If there are still multiple PUSCHs overlap with Z in the earliest PUSCH slot(s), follow the following priorities (sequentially from high to low)
      - Third priority: Dynamic grant PUSCHs > PUSCHs configured by respective ConfiguredGrantConfig or semiPersistentOnPUSCH
      - Fourth priority: PUSCHs on serving cell with smaller serving cell index > PUSCHs on serving cell with larger serving cell index
      - Fifth priority: Earlier PUSCH transmission > later PUSCH transmission Note: The clarification applies to both cases with the same (except the second priority part) and different numerologies among PUCCH and PUSCHs.

FIG. 6

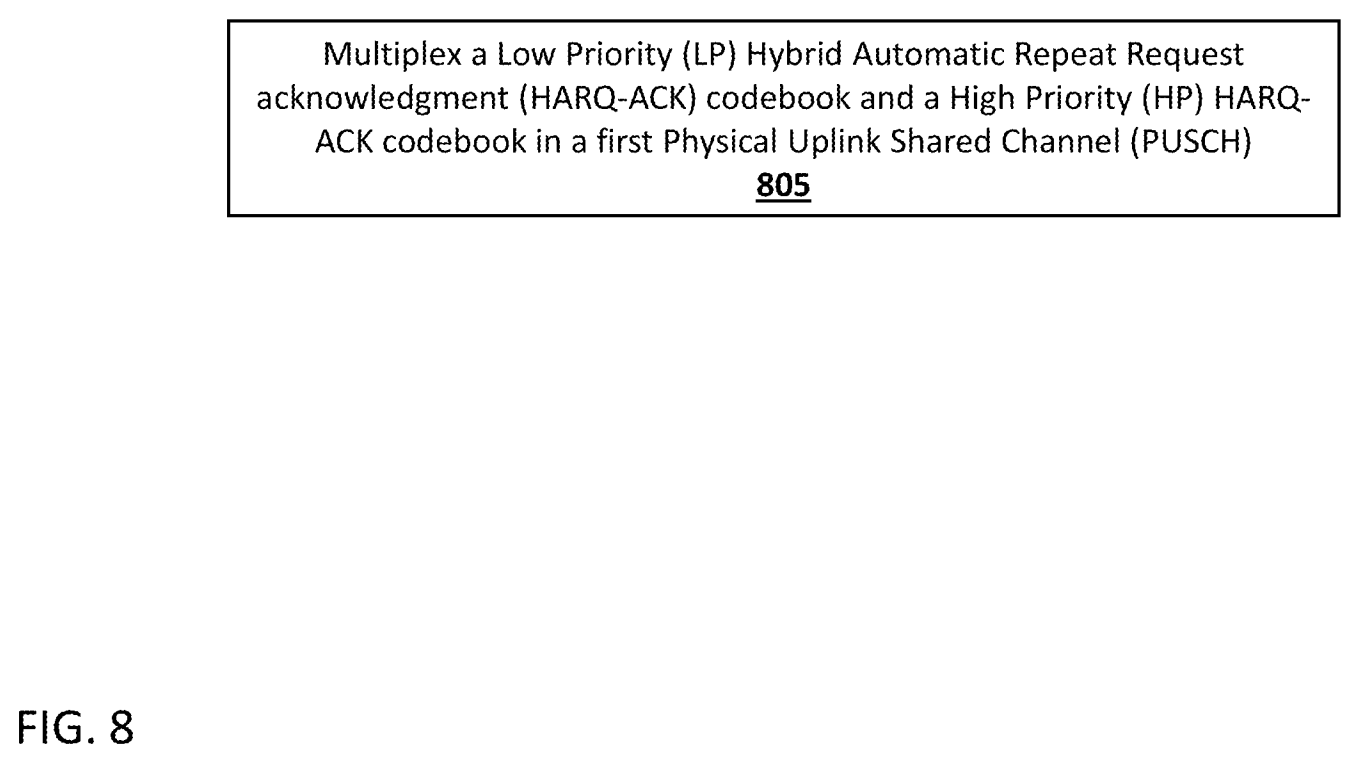

Multiplex a Low Priority (LP) Hybrid Automatic Repeat Request acknowledgment (HARQ-ACK) codebook and a High Priority (HP) HARQ-ACK codebook in a first Physical Uplink Shared Channel (PUSCH)

<u>805</u>

FIG. 8

SYSTEM AND METHOD FOR MULTIPLEXING UPLINK CHANNELS

CROSS-REFERENCE TO RELATED APPLICATION(S)

The present application (i) claims priority to and the benefit of U.S. Provisional Application No. 63/182,395, filed Apr. 30, 2021, entitled "INTRA-UE MULTIPLEXING AND PRIORITIZATION", and (ii) claims priority to and the benefit of U.S. Provisional Application No. 63/186,691, filed May 10, 2021, entitled "INTRA-UE MULTIPLEXING AND PRIORITIZATION"; the entire contents of both of the applications identified in this paragraph are incorporated herein by reference.

FIELD

One or more aspects of embodiments according to the present disclosure relate to wireless communications, and more particularly to a system and method for multiplexing uplink communications.

BACKGROUND

In a wireless system, a User Equipment (UE) may under certain circumstances multiplex different types of uplink communications when such uplink communications are scheduled, by the network node, to overlap, in time. When the uplink communications include Low Priority and High Priority communications, various methods may be employed to enhance reliability and reduce latency.

It is with respect to this general technical environment that aspects of the present disclosure are related.

SUMMARY

According to an embodiment of the present disclosure, there is provided a method, including: multiplexing, by a User Equipment (UE) a Low Priority (LP) Hybrid Automatic Repeat Request acknowledgment (HARQ-ACK) codebook and a High Priority (HP) HARQ-ACK codebook in a first Physical Uplink Shared Channel (PUSCH), the multiplexing including mapping the HP HARQ-ACK codebook after a first symbol that follows a Demodulation Reference Signal (DMRS) and that does not include any DMRS Resource Elements (REs).

In some embodiments, the multiplexing further includes mapping the LP HARQ-ACK codebook from a first PUSCH symbol which does not include any DMRS REs.

In some embodiments, the method further includes: determining, by the UE, that the LP HARQ-ACK codebook has a payload size less than a first threshold, the first threshold being T1 bits; and transmitting, by the UE, a number of HARQ-ACK REs corresponding to T1 bits.

In some embodiments, the method further includes: determining, by the UE, that the LP HARQ-ACK codebook has a payload size greater, by n bits, than the first threshold; and dropping, by the UE, n bits of the LP HARQ-ACK payload.

In some embodiments, the method further includes: determining that the payload size is greater than T1 and less than a second threshold, the second threshold being T2 bits; and transmitting, by the UE, a number of HARQ-ACK REs corresponding to T2 bits.

In some embodiments: the first PUSCH is an HP PUSCH; and the method further includes receiving, in a Downlink Control Information (DCI) scheduling the first PUSCH, a total Downlink Assignment Index (T-DAI) for the LP HARQ-ACK codebook.

In some embodiments: the first PUSCH is an LP PUSCH; and the method further includes receiving, in a Downlink Control Information (DCI) scheduling the first PUSCH, a total Downlink Assignment Index (T-DAI) for the HP HARQ-ACK codebook.

In some embodiments, the LP HARQ-ACK codebook is a Type-2 HARQ-ACK codebook or an enhanced Type-2 HARQ-ACK codebook.

In some embodiments, the method further includes: selecting, by the UE, from among a plurality of PUSCHs overlapping a first PUCCH, a second PUSCH, the second PUSCH having the same priority as the first PUCCH; and multiplexing the first PUCCH in the second PUSCH.

In some embodiments, the method further includes: receiving a plurality of tables of offset values; selecting a first table from among the plurality of tables based on an Uplink Control Information (UCI) priority and based on a priority of the first PUSCH; and calculating a number of Resource Elements (REs) based on an offset value in the first table.

According to an embodiment of the present disclosure, there is provided a User Equipment (UE), including: a radio; and a processing circuit, the processing circuit being configured to multiplex a Low Priority (LP) Hybrid Automatic Repeat Request acknowledgment (HARQ-ACK) codebook and a High Priority (HP) HARQ-ACK codebook in a first Physical Uplink Shared Channel (PUSCH), the multiplexing including mapping the HP HARQ-ACK codebook after a first PUSCH symbol that follows a Demodulation Reference Signal (DMRS) and that does not include any DMRS Resource Elements (REs).

In some embodiments, the multiplexing further includes mapping the LP HARQ-ACK codebook from a first PUSCH symbol which does not include any DMRS REs.

In some embodiments, the processing circuit is further configured to: determine that the LP HARQ-ACK codebook has a payload size less than a first threshold, the first threshold being T1 bits; and transmit a number of HARQ-ACK REs corresponding to T1 bits.

In some embodiments, the processing circuit is further configured to: determine that the LP HARQ-ACK codebook has a payload size greater, by n bits, than the first threshold; and drop n bits of the LP HARQ-ACK payload.

In some embodiments, the processing circuit is further configured to: determine that the payload size is greater than T1 and less than a second threshold, the second threshold being T2 bits; and transmit a number of HARQ-ACK REs corresponding to T2 bits.

In some embodiments: the first PUSCH is an HP PUSCH; and the processing circuit is further configured to receive, in a Downlink Control Information (DCI) scheduling the first PUSCH, a total Downlink Assignment Index (T-DAI) for the LP HARQ-ACK codebook.

In some embodiments: the first PUSCH is an LP PUSCH; and the processing circuit is further configured to receive, in a Downlink Control Information (DCI) scheduling the first PUSCH, a total Downlink Assignment Index (T-DAI) for the HP HARQ-ACK codebook.

In some embodiments, the LP HARQ-ACK codebook is a Type-2 HARQ-ACK codebook or an enhanced Type-2 HARQ-ACK codebook.

In some embodiments, the processing circuit is further configured to: select, from among a plurality of PUSCHs overlapping a first PUCCH, a second PUSCH, the second PUSCH having the same priority as the first PUCCH; and multiplex the first PUCCH in the second PUSCH.

According to an embodiment of the present disclosure, there is provided a method including: determining, by a User Equipment (UE), that a first channel uplink transmission and a second channel uplink transmission would overlap in time, the first channel uplink transmission associated with first Hybrid Automatic Repeat Request acknowledgment (HARQ-ACK) bits having a first priority and the second channel uplink transmission associated with second HARQ-ACK bits having a second priority; determining a first number of Resource Elements (REs) to allocate to the first HARQ-ACK bits and a second number of REs to allocate to the second HARQ-ACK bits, the second number of REs being dependent on the first number of REs; multiplexing, by the UE, according to the first number of REs and the second number of REs, the first HARQ-ACK bits and the second HARQ-ACK bits in one of the first channel uplink transmission and the second channel uplink transmission; and transmitting, by the UE, the one of the first channel uplink transmission and the second channel uplink transmission.

In some embodiments, the first priority is a higher priority than the second priority.

In some embodiments, the one of the first channel uplink transmission and the second channel uplink transmission is a Physical Uplink Shared Channel (PUSCH).

BRIEF DESCRIPTION OF THE DRAWINGS

These and other features and advantages of the present disclosure will be appreciated and understood with reference to the specification, claims, and appended drawings wherein:

FIG. 2 is a table of mapping procedures, according to an embodiment of the present disclosure;

FIG. 4A is a table of channel priorities, according to an embodiment of the present disclosure;

FIG. 4B is a table showing an excerpt of a Technical Specification, according to an embodiment of the present disclosure;

FIG. 5 is a table showing an excerpt of a Technical Specification, according to an embodiment of the present disclosure;

FIG. 6 is a table showing an excerpt of an agreement, according to an embodiment of the present disclosure;

FIG. 8 is a flowchart, according to an embodiment of the present disclosure.

DETAILED DESCRIPTION

The detailed description set forth below in connection with the appended drawings is intended as a description of exemplary embodiments of a system and method for multiplexing uplink communications provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
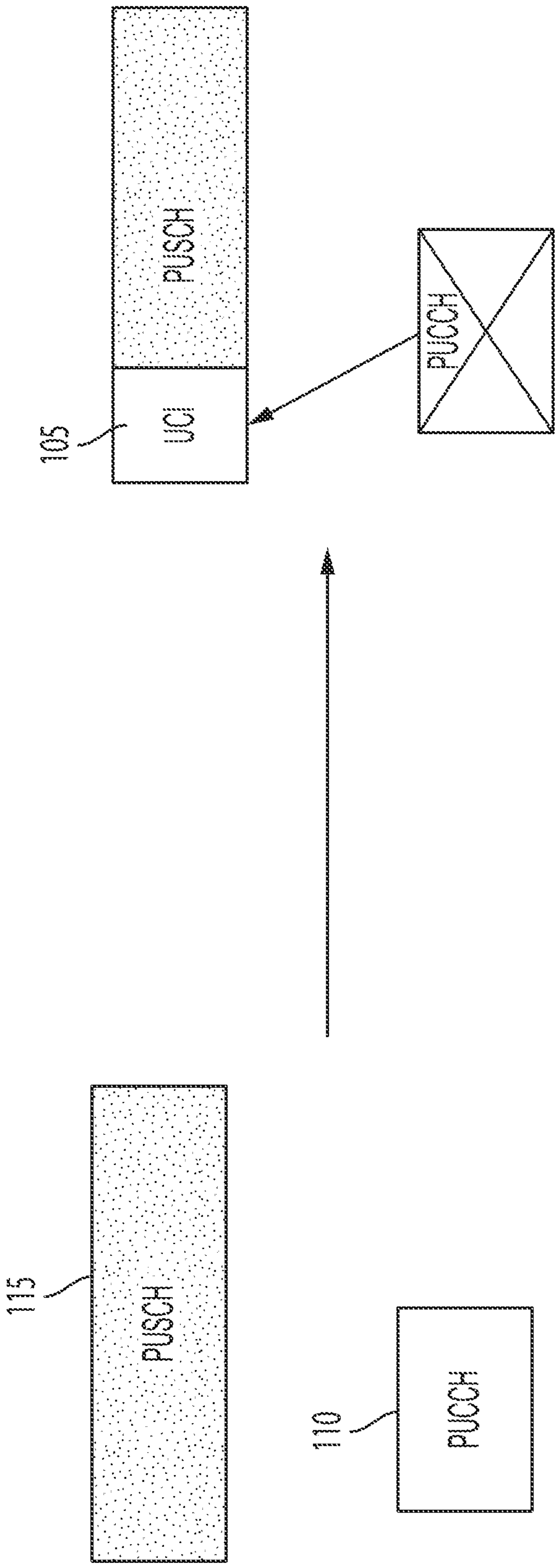
FIG. 1 is an uplink communications timing diagram, according to an embodiment of the present disclosure.

Referring to FIG. 1, in some New Radio (NR) systems, a User Equipment (UE) may transmit the Uplink Control Information (UCI) 105 on a Physical Uplink Control Channel (PUCCH) or Physical Uplink Shared Channel (PUSCH). If the network schedules a PUSCH 110 which overlaps in time with the PUCCH 115 or there is a semi-statically configured PUSCH such as a configured grant (CG) PUSCH, the UE may drop the transmission of the PUCCH 115 and multiplex its content on the PUSCH 115, as shown on the right hand side of FIG. 1. This may also be referred to as UCI piggybacking on a PUSCH.

In various embodiments involving UCI multiplexing on a PUSCH, different UCI types, including channel state information (CSI) part 1 and CSI part 2, and Hybrid Automatic Repeat Request acknowledgment (HARQ-ACK) may be separately encoded. The number of Resource Elements (REs) for HARQ-ACK and CSI may be determined based on the number of REs of the PUSCH and some control parameters configured to the UE via Radio Resource Control (RRC) and indicated via DCI, referred to as β and α offsets, and the HARQ-ACK and CSI payload size, as follows:

$$Q'_{ACK} = \min\left\{\left\lceil \frac{(O_{ACK}+L_{ACK})\cdot\beta_{offset}^{PUSCH}\cdot\sum_{l=0}^{N_{symbol}^{PUSCH}-1} M_{sc}^{UCI}(l)}{\sum_{r=0}^{C_{UL\text{-}SCH}-1} K_r}\right\rceil, \left\lceil \alpha\cdot\sum_{l=l_0}^{N_{symbol}^{PUSCH}-1} M_{sc}^{UCI}(l)\right\rceil\right\}$$

$$Q'_{CSI-1} = \min\left\{\left\lceil \frac{(O_{CSI-1}+L_{CSI-1})\cdot\beta_{offset}^{PUSCH}\cdot\sum_{l=0}^{N_{symbol}^{PUSCH}-1} M_{sc}^{UCI}(l)}{\sum_{r=0}^{C_{UL\text{-}SCH}-1} K_r}\right\rceil, \left\lceil \alpha\cdot\sum_{l=0}^{N_{symbol}^{PUSCH}-1} M_{sc}^{UCI}(l)\right\rceil - Q'_{ACK}\right\}$$

$$Q'_{CSI-1} = \min\left\{\left\lceil \frac{(O_{CSI-1}+L_{CSI-1})\cdot\beta_{offset}^{PUSCH}}{R\cdot Q_m}\right\rceil, \sum_{l=0}^{N_{symbol}^{PUSCH}-1} M_{sc}^{UCI}(l) - Q'_{ACK}\right\}$$

where the symbols of the foregoing equations are defined in Technical Specification (TS) 38.212 (Release 15 and later).

The coded bits of HARQ-ACK, CSI part 1 and CSI part 2 may then be placed on the REs of the PUSCH in certain places. Since fewer REs are available for PUSCH data transmission after UCI multiplexing, only a subset of data symbols may be chosen to be carried on the available REs of the PUSCH.

There may be two different approaches for the multiplexing of UCI data on a PUSCH: puncturing and rate matching. The following determines the UCI multiplexing procedure:

$$\text{UL-SCH code bits: } g_0^{UL\text{-}SCH}, g_1^{UL\text{-}SCH}, \ldots, g_{G^{UL\text{-}SCH}-1}^{UL\text{-}SCH}$$

$$\text{HARQ-ACK code bits: } g_0^{ACK}, g_1^{ACK}, \ldots, g_{G^{ACK}-1}^{ACK}$$

$$\text{CSI-part 1 code bits: } g_0^{CSI\text{-}part1}, g_1^{CSI\text{-}part1}, \ldots, g_{G^{CSI\text{-}part1}-1}^{CSI\text{-}part1}$$

$$\text{CSI-part 2 code bits: } g_0^{CSI\text{-}part2}, g_1^{CSI\text{-}part2}, \ldots, g_{G^{CSI\text{-}part1}-1}^{CSI\text{-}part2}$$

- No UCI is mapped to DMRS-carrying symbol.
- ACK bits are only mapped to a RE coming after the set of consecutive Demodulation Reference Signal (DMRS) symbols.
- For number of ACK info bits≤2 in Step 1, number of REs are reserved for ACK.
- For number of ACK info bits>2 in Step 2, number of REs are mapped for ACK.

Figure 3A:
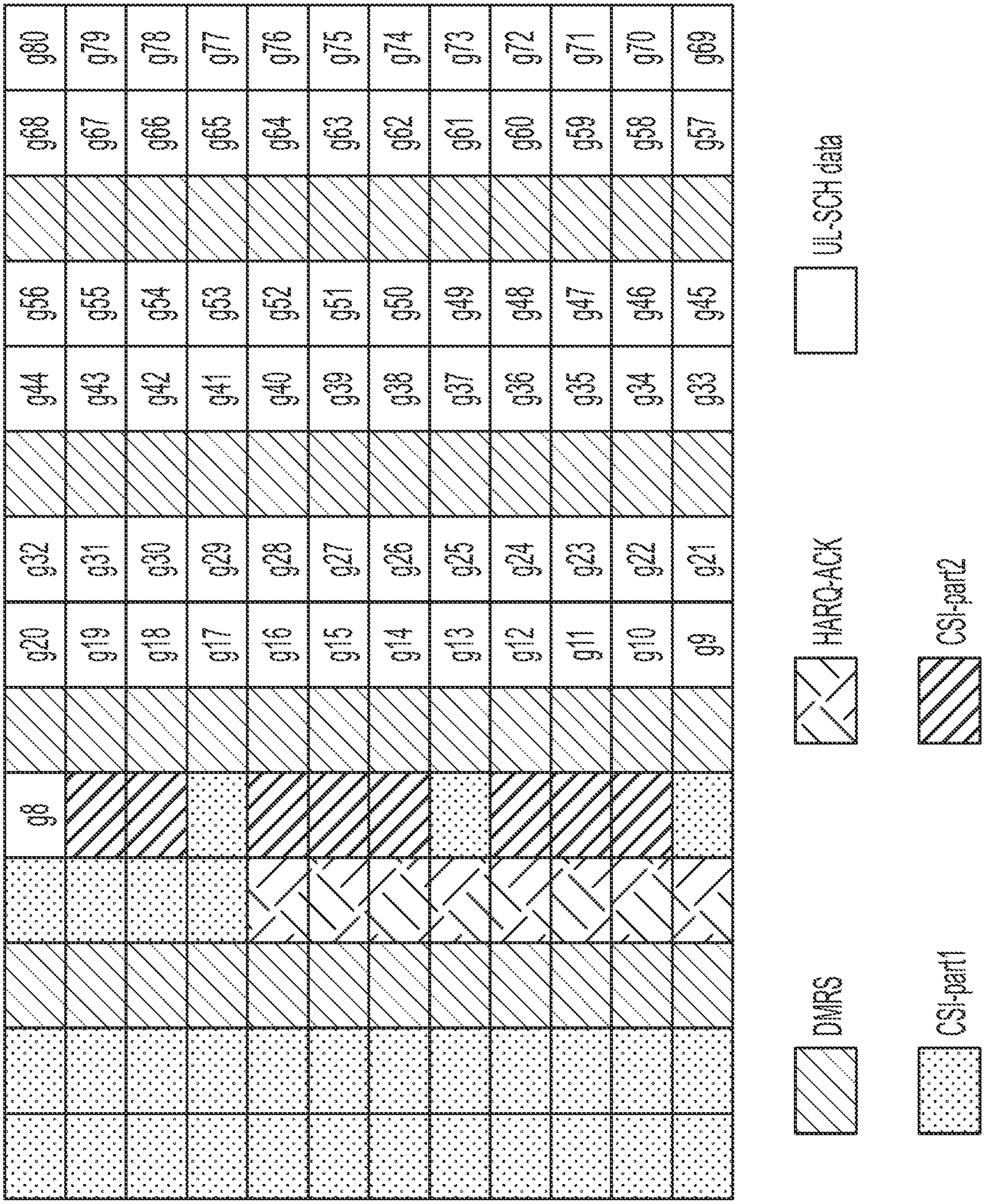
FIG. 3A is a Resource Element diagram, according to an embodiment of the present disclosure.
Figure 3B:
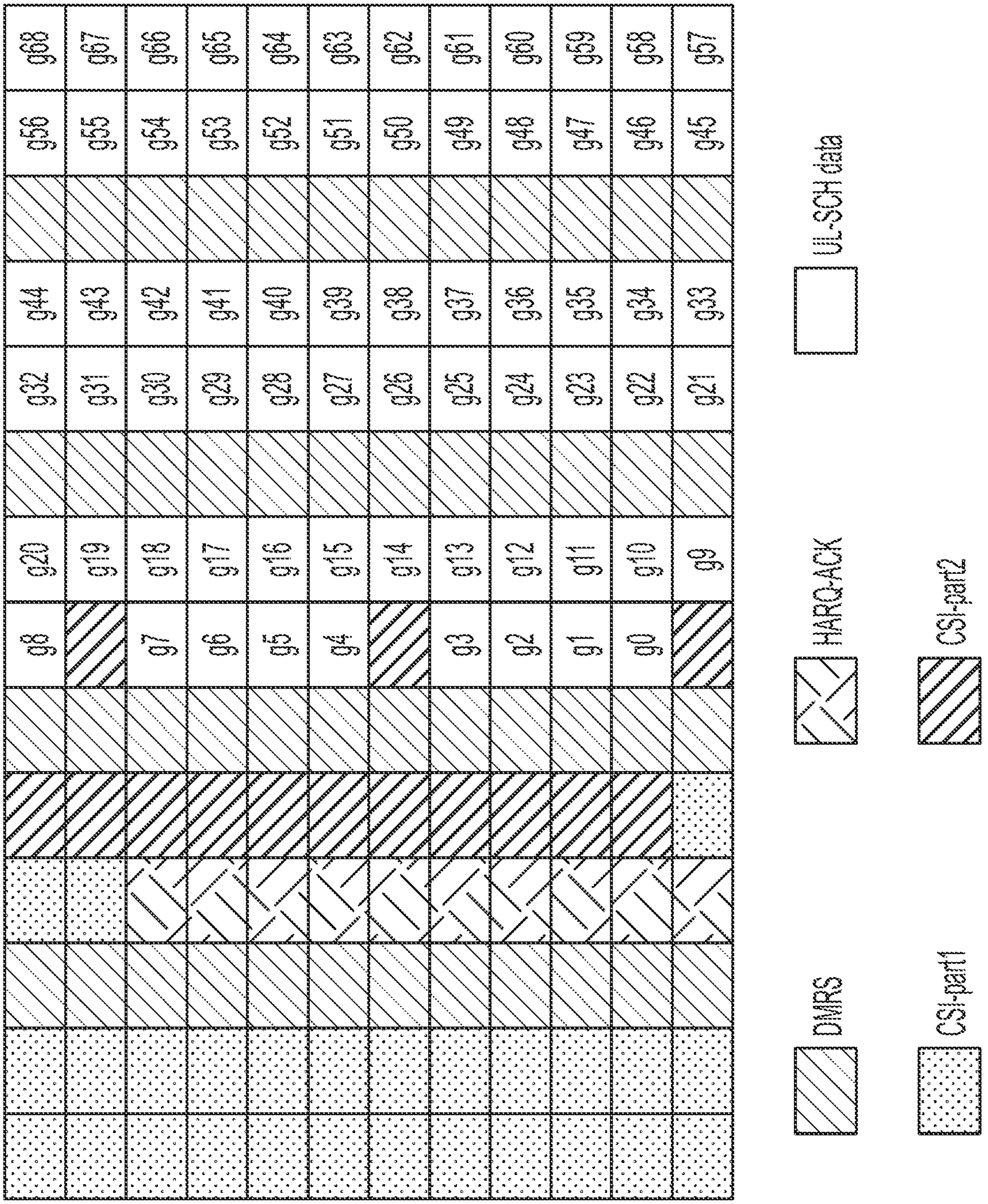
FIG. 3B is a Resource Element diagram, according to an embodiment of the present disclosure.

The table of FIG. 2 shows an example obtained by the procedure. If the number of acknowledgement/negative acknowledgement (ACK/NACK or "A/N") bits is smaller than or equal to 2, puncturing may be used. FIG. 3A shows an example of the use of puncturing. If the number of A/N bits is greater than 2, rate matching may be used. FIG. 3B shows an example of the use of rate matching.

In Release 16 (Rel-16) of the $5^{th}$ generation standard (5G) promulgated by the 3rd Generation Partnership Project, uplink channels may have one of two priorities, referred to as Low Priority (LP) and High Priority (HP). The priorities of PUSCHs are naturally defined according to the service types via scheduling DCI or RRC configurations. The priority of a Scheduling Request (SR) PUCCH is related to the service type of the SR and hence to the priority of the SR. Similarly, the priority of a HARQ-ACK PUCCH is determined by that of the corresponding Physical Downlink Shared Channels (PDSCHs). Among the CSI types, only aperiodic CSI can be high priority as it is triggered by a DCI. Periodic CSI (P-CSI) or semi-persistent CSI (SP-CSI) may not be set to high priority. The table of FIG. 4 shows Rel-16 channel priorities.

Furthermore, the notion of sub-slots is introduced to define uplink time units smaller than a slot. In particular a sub-slot can be defined as length-2 or length-7 in Rel-16. With a length-2 sub-slot configuration every slot consists of seven sub-slots, while with a length-7 sub-slot configuration every slot consists of two sub-slots. The UE may transmit at most one HARQ-ACK PUCCH per sub-slot per priority index. FIG. 4B (excepted from Section 9 of TS 38.213) specifies the Physical (Phy) layer priority and sub-slot description.

In Rel-16, once an uplink channel with priority index 0 (lower priority) overlaps in time with an uplink channel with priority index 1 (higher priority) the UE drops the lower priority channel. There is no multiplexing of low priority (LP) and high priority (HP) channels in Rel-16. As such, one approach to handle the overlapping of LP and HP channels is to drop the LP channel. Although this behavior is simple, in some cases it may have a negative impact on system performance. For example, if an LP PUCCH, which carries LP HARQ-ACK bits corresponding to the Enhanced Mobile Broadband (eMBB) service type, overlaps with an HP PUCCH which carries HARQ-ACK bits of a higher priority service type, e.g. Ultra-Reliable Low Latency Communications (URLLC), the LP PUCCH may be dropped. Dropping the LP PUCCH will have a negative impact on the peak data rate of eMBB as all of the transmitted PDSCHs then need to be retransmitted by the network node (gNB). As such, in some embodiments, the UE does not drop the LP PUCCH, but it multiplexes both the LP and the HP HARQ-ACK in the same PUCCH or PUSCH. The following discusses the multiplexing of LP HARQ-ACK PUCCH or HP HARQ-ACK PUCCH on a PUSCH which may be LP or HP.

It may be advantageous, in a method for multiplexing a UCI on a PUSCH to incorporate measures to maintain the reliability of both the UCI and the PUSCH. According to Rel-16, if the number of HARQ-ACK bits, i.e., the payload size, is larger than 2, rate matching is used and the HARQ-ACK is rate matched around the PUSCH data REs. An incorrect applied HARQ-ACK payload size, i.e., a mismatch between the UE and the gNB with respect to the HARQ-ACK payload size, will result in a PUSCH decoding failure, and necessitate multiple blind decodings (BDs) at the gNB. Therefore when rate matching is used, it may be advantageous for the UE and the gNB to have the same understanding of the HARQ-ACK payload size, i.e., for the HARQ-ACK payload size to be highly reliable. While the HARQ-ACK payload size may be reliable for the HP HARQ-ACK, due to higher Physical Downlink Control Channel (PDCCH) reliability for uRLLC, the LP HARQ-ACK payload size reliability may be orders of magnitude smaller than that of the HP HARQ-ACK. Therefore when both LP and HP HARQ-ACK are multiplexed in the same PUSCH, the LP HARQ reliability may become the bottleneck for the reliability of the PUSCH and the HP HARQ-ACK.

As such, in some embodiments, a method referred to herein as Method 0-0 (which involves applying a hard threshold on the LP payload size when multiplexing an LP HARQ-ACK and an HP HARQ-ACK on a PUCCH/PUSCH) may be employed. If a UE multiplexes an LP HARQ-ACK and an HP HARQ-ACK in a PUSCH and the size of the LP HARQ-ACK payload size, determined by the UE, is less than or equal to T, the UE determines the number of REs of the PUSCH used for the LP HARQ-ACK assuming an LP payload size of T bits. The LP HARQ-ACK rate matches the PUSCH. In one embodiment, the UE may expect that the number of LP HARQ-ACK bits is less than or equal to T if it multiplexes the LP HARQ-ACK and the HP HARQ-ACK in the same PUSCH. In another embodiment, if the UE determines the number of LP HARQ-ACK bits to be greater than T bits (e.g., by n bits), it only multiplexes the first T bits in the PUSCH and drops the remaining n bits.

Method 0-0 is simple and may ensure the reliability of the PUSCH and HP HARQ-ACK. It also requires one decoding attempt for the LP HARQ-ACK. This method, however, may in some circumstances needlessly use a significant amount of resources for the LP HARQ-ACK. As such, another approach, referred to herein as Method 0-1, may be taken as follows. Method 0-1 may involve LP and HP HARQ-ACK multiplexing on a PUCCH/PUSCH using a staircase threshold on the LP payload size. For example, if the UE multiplexes an LP HARQ-ACK codebook (CB) and an HP HARQ-ACK codebook in a PUSCH, and the UE has M LP HARQ-ACK bits, the UE may determine the number of REs of the PUSCH used for the LP HARQ-ACK codebook assuming the following payload size for the LP HARQ-ACK codebook. In the present disclosure, "HARQ-ACK" and "HARQ-ACK codebook" are used interchangeably.

If $M \leq T_1$, the UE assumes the LP payload size is $T_1$ and determines the number of REs of the PUSCH based on $T_1$.

If $T_{i-1}<M\leq T_i$, for some $i\in\{2, \ldots, i_{max}\}$, the UE assumes the LP payload size is $T_i$ and determines the number of REs of the PUSCH based on $T_i$, where $i_{max}$ is the number of thresholds.

The thresholds $T_i$ may be fixed (e.g., specified in the standard) or RRC configured for the UE by the gNB. In one embodiment, the UE may expect that the number of LP HARQ-ACK bits to multiplex with an HP HARQ-ACK in the PUSCH is less than or equal to $T_{i_{max}}$. In another embodiment, if the number of LP HARQ-ACK bits is greater than $T_{i_{max}}$, the UE only multiplexes the first $T_{i_{max}}$ bits in the PUSCH and drops the remaining bits.

One advantage of Method 0-1 is that it can provide increased reliability in terms of a common understanding between the UE and the gNB regarding the LP HARQ-ACK payload size, while not utilizing an excessive amount of resources for the LP HARQ-ACK, as the thresholds are applied in more granularity than Rel-15/16.

The ability of Method 0-1 to provide greater reliability in terms of the number of REs allocated for the LP HARQ-ACK between the UE and the gNB may be understood as follows for an example in which $T_1=10$ and $T_2=20$. If the correct LP payload size expected by the gNB is 18 bits and a Type-2 codebook is configured, and if the UE does not miss any DCIs, it will determine the payload size as 18 and determine the number of REs assuming $T_2=20$ LP bits. If the UE misses four PDCCHs in a row, it may end up having 14 bits, and it may nonetheless use $T_2=20$ LP bits to determine the number of REs to use for the LP codebook. Even if the UE were to miss eight PDCCHs in a row, it would still determine the number of REs assuming 20 bits, which is the common understanding between the UE and the gNB. However, beyond this point, if the UE misses more PDCCHs it may end up having fewer than 10 bits and thus determining the number of REs of the PUSCH assuming 10 bits, which may cause a misunderstanding between the UE and the gNB. If the actual number of LP HARQ-ACK bits was close to $T_1$, e.g., 12 bits, then even missing four PDCCHs in a row will cause a mismatch between the UE and the gNB, as the UE will determine the number of PUSCH REs for the LP HARQ-ACK based on $T_1=10$ bits. In practice, the gNB may configure the value of $T_i$ such that the $T_i-T_{i-1}$ are large numbers, so that missing PDCCHs is less likely to take the determined number of LP HARQ-ACK bits to the previous interval. Moreover, the gNB may adjust the scheduling of eMBB traffic such that the number of LB HARQ-ACK bits is always near the upper end of (e.g., within the upper half of) one of the intervals $(T_{i-1}, T_i]$.

Methods 0-0 and 0-1 may increase the common understanding between the UE and gNB on the applied number of REs for HARQ-ACK allocation. Misunderstandings, when they occur, may be due primarily to HARQ-ACK payload size error. HARQ_ACK payload size may be in error only when Type-2 HARQ-ACK CB is configured. Therefore methods 0-0 and 0-1 may be applicable primarily to Type-2 HARQ-ACK CBs. As such, a method referred to herein as Method 0-2 may involve using a Type-2 HARQ-ACK codebook. If a UE multiplexes an LP HARQ-ACK codebook and an HP HARQ-ACK codebook in a PUSCH, the UE may determine the number of REs of the LP HARQ-ACK codebook according to Method 0-0 or according to Method 0-1 only if the configured HARQ-ACK CB for the LP HARQ-ACK is dynamic, e.g., Type-2 or enhanced Type-2. The UE may perform according to Rel-15 or Rel-16 if the associated LP HARQ-ACK CB is semi-static, e.g., a Type-1 codebook or a Type-3 codebook.

Once the number of REs of the LP HARQ-ACK codebook and of the HP HARQ-ACK codebook are determined, the next step may be to determine which REs of the PUSCH are used for the HARQ-ACK codebook or codebooks. In some embodiments, since the HP HARQ_ACK codebook needs to be more reliable, it may be mapped to the symbol right after the DMRS symbol, to provide better channel estimation quality. In another approach it may be mapped to the first symbol of the PUSCH to ensure low latency. In any case, the LP HARQ-ACK codebook may be mapped such that an incorrect LP payload size has no impact on the HP HARQ-ACK codebook. For example, the LP HARQ-ACK may be mapped to the REs which come after the HP HARQ-ACK codebook. In the following, different solutions for mapping are considered.

For example, in a method referred to herein as Method 0-3, the HP HARQ-ACK is mapped to the first symbol after the DMRS. When the UE multiplexes an LP HARQ-ACK codebook and an HP HARQ-ACK codebook in a PUSCH, after determining the number of REs of PUSCH for each HARQ-ACK, the HP HARQ-ACK is mapped starting from the first symbol after the DMRS symbol which does not include any DMRS REs. The LP HARQ-ACK codebook is mapped (i) starting from the end of the HP HARQ-ACK codebook (if there are both LP and HP HARQ-ACK PUCCHs overlapping with the PUSCH), or (ii) (otherwise) starting with the first PUSCH symbol which does not include any DMRS REs (which may be a symbol preceding the DMRS). A separate set of REs may be allocated for each of the LP HARQ-ACK and for the HP HARQ-ACK. The number of REs allocated to the LP HARQ-ACK may depend on the number of REs allocated to the LP HARQ-ACK. As such, in some embodiments, a method includes determining, by a UE, that a first channel uplink transmission and a second channel uplink transmission would overlap in time, the first channel uplink transmission associated with first Hybrid Automatic Repeat Request acknowledgment (HARQ-ACK) bits having a first priority and the second channel uplink transmission associated with second HARQ-ACK bits having a second priority; determining a first number of REs to allocate to the first HARQ-ACK bits and a second number of REs to allocate to the second HARQ-ACK bits, the second number of REs being dependent on the first number of REs; multiplexing, by the UE, according to the first number of REs and the second number of REs, the first HARQ-ACK bits and the second HARQ-ACK bits in one of the first channel uplink transmission and the second channel uplink transmission; and transmitting, by the UE, the one of the first channel uplink transmission and the second channel uplink transmission. In such an embodiment, the first priority may be a higher priority than the second priority, and the one the first channel uplink transmission and the second channel uplink transmission may be a PUSCH.

One other issue is to determine the number of REs of the PUSCH. If the HARQ-ACK and the CSI have the same priority, the following formulas are used in Rel-15 and Rel-16 to determine the number of REs:

$$Q'_{ACK} = \min\left\{\left\lceil \frac{(O_{ACK}+L_{ACK})\cdot\beta_{offset}^{PUSCH}\cdot\sum_{l=0}^{N_{symbol}^{PUSCH}-1} M_{sc}^{UCI}(l)}{\sum_{r=0}^{C_{UL-SCH}-1} K_r}\right\rceil, \left\lceil \alpha\cdot\sum_{l=l_0}^{N_{symbol}^{PUSCH}-1} M_{sc}^{UCI}(l)\right\rceil\right\}$$

-continued $$Q'_{CSI-1} = \min\left\{\left\lceil \frac{(O_{CSI-1} + L_{CSI-1}) \cdot \beta_{offset}^{PUSCH} \cdot \sum_{l=0}^{N_{symbol}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symbol}^{PUSCH}-1} M_{sc}^{UCI}(l) \right\rceil - Q'_{ACK} \right\}$$

$$Q'_{CSI-1} = \min\left\{\left\lceil \frac{(O_{CSI-1} + L_{CSI-1}) \cdot \beta_{offset}^{PUSCH}}{R \cdot Q_m} \right\rceil, \sum_{l=0}^{N_{symbol}^{PUSCH}-1} M_{sc}^{UCI}(l) - Q'_{ACK} \right\}$$

Since the LP HARQ-ACK is of lower priority than the HP HARQ-ACK, it may follow the formula for CSI-part 1, i.e., the number of REs $Q'_{ACK,HP}$ for an HP HARQ-ACK codebook may follow the first formula. The number of REs for the LP HARQ-ACK codebook may then be determined taking into account the number of REs assigned to the HP HARQ-ACK codebook, according to the second formula (modified by replacing $Q'_{ACK}$ with $Q'_{ACK,HP}$) and using the provided β and α for the LP HARQ-ACK. The application of the formula may also depend on the total HP and LP HARQ-ACK bits or the individual number of HARQ-ACK bits.

A different approach to mitigate the risk of an LP HARQ-ACK payload size mismatch is to include an uplink DAI (UL-DAI) in the scheduling DCI. The role of UL-DAI is to indicate to the UE the value of T-DAI in the last monitoring occasion (MO) index which includes a scheduling DCI. If the UE misses all the DCIs in the last MO index, the HARQ-ACK payload size will be incorrect and the PUSCH decoding will fail. In Rel-16 the value of the UL-DAI in the scheduling DCI of an LP or HP PUSCH indicates the value of T-DAI for the corresponding LP or HP HARQ-ACK CBs. In a case in which an LP HARQ-ACK PUCCH is multiplexed in an HP PUSCH, the scheduling DCI of the PUSCH may further include the value of T-DAI for the LP HARQ-ACK CB to ensure improved reliability for the HARQ-ACK payload size. This approach may be referred to as Method 0-5, which involves including, in a DCI, a UL-DAI for the other priority. In Method 0-5, when a UE is configured with cross-priority multiplexing (i.e., multiplexing of an LP HARQ-ACK PUCCH in an HP PUSCH, or multiplexing of an HP HARQ-ACK PUCCH in an LP PUSCH), the scheduling DCI of the HP or LP PUSCH includes a T-DAI field which indicates the value of T-DAI for the LP or HP HARQ-ACK codebook.

For example, a DCI which schedules a PUSCH of a certain priority index includes a T-DAI field which indicates the value of the T-DAI for the HARQ-ACK CB for another, different priority index. In one embodiment, the DCI may indicate T-DAI for one of LP and HP HARQ-ACK codebooks, and which T-DAI is to be included may be indicated to a UE via a high layer such as a Media Access Control (MAC) Control Element (MAC-CE) or RRC.

According to the above, the gNB may configure two different T-DAI fields in the DCI format scheduling a PUSCH. When the UE multiplexes an LP HARQ-ACK PUCCH or an HP HARQ-ACK PUCCH (or both) in the HP/LP PUSCH, the UE applies each value of the T-DAI in the DCI scheduling the PUSCH to determine the HARQ-ACK size of the LP and HP codebooks.

In Rel-15/16 simultaneous transmission of PUCCH and PUSCH on the same or different serving cells is not supported. In particular, in case of overlapping PUCCH and PUSCH, the UE either drops the PUCCH or multiplexes the UCI of PUCCH in the PUSCH. In case PUCCH overlaps with multiple PUSCHs on the PUCCH cell or different serving cells, the UE selects one PUSCH among the overlapping ones and multiplexes the UCI in the PUSCH.

Figure 7:
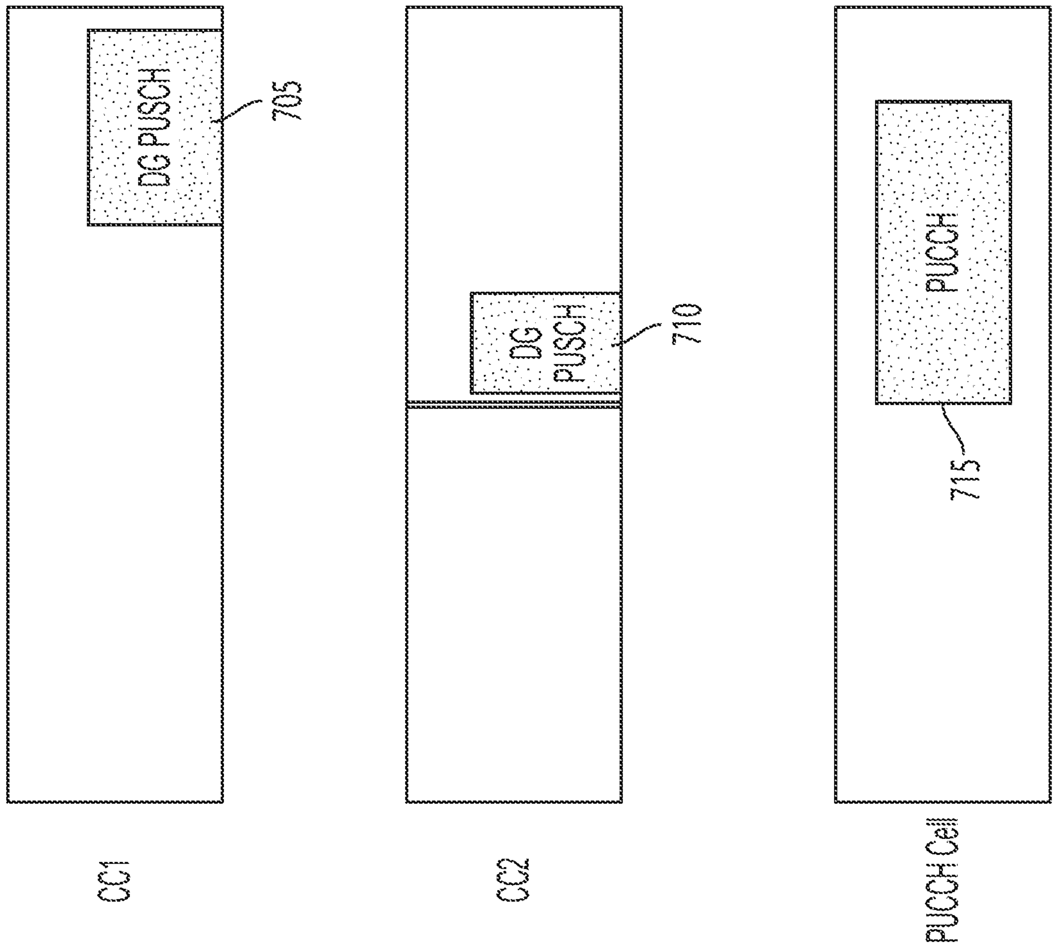
FIG. 7 is an uplink communications timing diagram, according to an embodiment of the present disclosure.

The table of FIG. 5 is an excerpt of TS38.213 specifying the PUSCH selection procedure. The PUSCH selection procedure is clarified in the table of FIG. 6, which is an excerpt from RAN1#96 of the 3GPP Technical Specification Group Radio Access Network (TSG RAN). If the procedure is used unaltered for the case of LP HARQ-ACK or HP HARQ-ACK multiplexing in a PUSCH, a PUSCH which is transmitted later in time may be used for carrying the HARQ-ACKs. For example, in FIG. 7, a Dynamic Grant (DG) PUSCH 705 on Component Carrier 1 (CC1) is used to transmit the UCI (of a PUCCH 715), as its associated slot starts earlier than that of DG PUSCH 710 on CC2. While this may be acceptable for an eMBB HARQ-ACK, it may be advantageous for a uRLLC HARQ-ACK to be transmitted as soon as possible. It may also be advantageous to select the PUSCH which has the smallest impact on the reliability of the UCI and UL data, e.g., based on the amount of resources for the original PUSCH transmission, its Modulation and Coding Scheme (MCS) and so on. The following focusses on the latency aspects of such procedures, and assumes that the PUSCHs all overlap with the HARQ-ACK PUCCH.

For example, a method referred to herein as Method 1-0 involves LP and HP HARQ-ACK multiplexing on a PUSCH, using PUSCH selection based on the start symbol. According to Method 1-0, if a UE multiplexes an LP HARQ-ACK codebook and an HP HARQ-ACK codebook in a PUCCH and the PUCCH overlaps with one or multiple PUSCHs on the same or different serving cells, the UE selects the PUSCH to multiplex the LP and HP HARQ-ACK codebooks in, by defining, in the procedure of FIG. 6, the second priority as follows: A PUSCH with an earlier start symbol is selected over a PUSCH with a later start symbol. If two PUSCHs have the same start symbol, the one with earliest end symbol is selected. The fifth priority is then removed.

Alternatively, in a method referred to herein as Method 1-1, the selection may be based on the end symbol, as it determines the PUSCH decoding delay if the PUSCH is HP. According to Method 1-1, if a UE multiplexes an LP HARQ-ACK codebook and an HP HARQ-ACK codebook in a PUCCH and the PUCHH overlaps with one or multiple PUSCHs on the same or different serving cells, the UE selects the PUSCH to multiplex the LP and HP HARQ-ACK in, by defining, in the procedure of FIG. 6, the second priority as follows: A PUSCH with an earlier end symbol is selected over a PUSCH with a later end symbol. If two PUSCHs have the same end symbol, the one with earliest start symbol is selected. The fifth priority is then removed.

In Rel-16, the above PUSCH selection rule is applied per priority. That is, if the HP PUCCH overlaps with multiple PUSCHs of different priority indices, the UE selects a PUSCH among the HP PUSCHs. This behavior may have certain disadvantages, however. First, if the UE selects the HP PUSCH to multiplex the HP HARQ-ACK codebook, it will degrade the reliability of the HP PUSCH. If an overlapping LP PUSCH exists, multiplexing the HP HARQ-ACK in the LP PUSCH instead may maintain the reliability of the HP PUSCH. Multiplexing of the HP HARQ-ACK in the LP PUSCH can also ensure the reliability of the HP HARQ-ACK when the gNB configures the UE with multiple values of β and α offsets to control the number of allocated resource elements. Second, an earlier LP PUSCH may exist, and if this is the case, it may be advantageous to multiplex the HP HARQ-ACK codebook in this earlier LP PUSCH to reduce the latency of the HP HARQ-ACK.

As such, a method referred to herein as Method 1-2 provides a method for PUSCH selection involving choosing the same priority for multiplexing. According to Method 1-2 when a UE is configured with cross-priority multiplexing, if the UE multiplexes a HARQ-ACK PUCCH in a PUSCH on the same or different serving cells, the UE chooses the PUSCH among the PUSCHs with the same priority index as the HARQ-ACK PUCCH, if there are any such PUSCHs, otherwise it chooses among the PUSCHs of another priority index.

A method referred to herein as Method 1-5 provides different sets of β offset configurations. According to Method 1-5, when a UE is configured with cross-priority multiplexing, if the UE multiplexes an HP HARQ-ACK PUCCH or other UCI in a PUSCH on the same or different serving cells, the gNB configures the UE with different tables of β offset values (which may be referred to simply as "offset values"). Each table corresponds to a specific combination of UCI priority and PUSCH priority. As an example, the gNB may configure four tables for (LP HARQ-ACK, LP PUSCH), (LP HARQ-ACK, HP PUSCH), (HP HARQ-ACK, LP PUSCH) and (HP HARQ-ACK, HP PUSCH). The UE may apply the indicated β offset in the DCI according to one of the above combinations.

Figure 9:
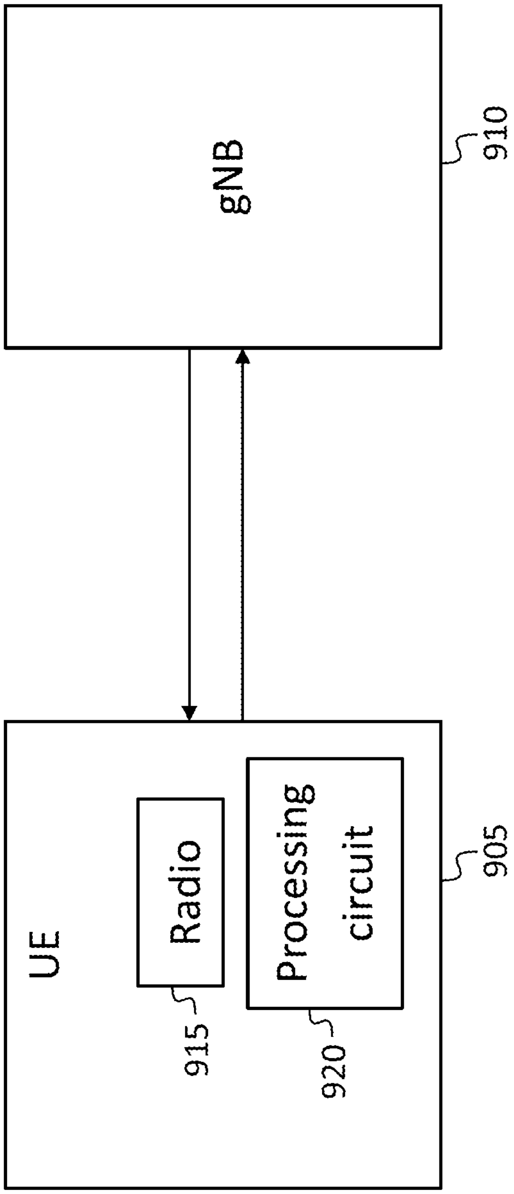
FIG. 9 is a block diagram of a system for wireless communications, according to an embodiment of the present disclosure.

FIG. 8 shows a flowchart of a method. In some embodiments, the method includes, multiplexing, at 805, by a User Equipment (UE) a Low Priority (LP) Hybrid Automatic Repeat Request acknowledgment (HARQ-ACK) codebook and a High Priority (HP) HARQ-ACK codebook in a first Physical Uplink Shared Channel (PUSCH), the multiplexing comprising mapping the HP HARQ-ACK after the first symbol not including any Demodulation Reference Signal (DMRS) Resource Element (RE). FIG. 9 shows a system including a UE 905 and a gNB 910, in communication with each other. The UE may include a radio 915 and a processing circuit (or a means for processing) 920, which may perform various methods disclosed herein, e.g., the method illustrated in FIG. 8. For example, the processing circuit 920 may receive, via the radio 915, transmissions from the network node (gNB) 910, and the processing circuit 920 may transmit, via the radio 915, signals to the gNB 910.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for multiplexing uplink communications have been specifically described and illustrated herein, many modifications and variations will be apparent to those skilled in the art. Accordingly, it is to be understood that a system and method for multiplexing uplink communications constructed according to principles of this disclosure may be embodied other than as specifically described herein. The invention is also defined in the following claims, and equivalents thereof.

What is claimed is:

1. A method, comprising:

multiplexing, by a User Equipment (UE) a Low Priority (LP) Hybrid Automatic Repeat Request acknowledgment (HARQ-ACK) codebook and a High Priority (HP) HARQ-ACK codebook in a first Physical Uplink Shared Channel (PUSCH), the multiplexing comprising:

mapping the LP HARQ-ACK codebook from a first PUSCH symbol that does not include any Demodulation Reference Signal (DMRS) Resource Elements (DMRS REs); and mapping the HP HARQ-ACK codebook after a first symbol that follows a DMRS symbol and does not include any DMRS REs;

determining, by the UE, that the LP HARQ-ACK codebook has a payload with a size greater, by n bits, than a first threshold; and dropping, by the UE, n bits of the payload of the LP HARQ-ACK codebook.

2. The method of claim 1, further comprising:

determining, by the UE, that the LP HARQ-ACK codebook has a payload size less than the first threshold, the first threshold being T1 bits, T1 being an integer; and transmitting, by the UE, a number of HARQ-ACK REs corresponding to T1 bits.

3. The method of claim 2, wherein n is an integer.

4. The method of claim 2, further comprising:

determining that the payload size is greater than T1 and less than a second threshold, the second threshold being T2 bits, T2 being an integer; and transmitting, by the UE, a number of HARQ-ACK REs corresponding to T2 bits.

5. The method of claim 1, wherein:

the first PUSCH is an HP PUSCH; and the method further comprises receiving, in a Downlink Control Information (DCI) scheduling the first PUSCH, a total Downlink Assignment Index (T-DAI) for the LP HARQ-ACK codebook.

6. The method of claim 1, wherein:

the first PUSCH is an LP PUSCH; and the method further comprises receiving, in a Downlink Control Information (DCI) scheduling the first PUSCH, a total Downlink Assignment Index (T-DAI) for the HP HARQ-ACK codebook.

7. The method of claim 1, wherein the LP HARQ-ACK codebook is a Type-2 HARQ-ACK codebook or an enhanced Type-2 HARQ-ACK codebook.

8. The method of claim 1, further comprising:

selecting, by the UE, from among a plurality of PUSCHs overlapping a first PUCCH, a second PUSCH, the second PUSCH having the same priority as the first PUCCH; and multiplexing the first PUCCH in the second PUSCH.

9. The method of claim 1, further comprising:

receiving a plurality of tables of offset values;

selecting a first table from among the plurality of tables based on an Uplink Control Information (UCI) priority and based on a priority of the first PUSCH; and calculating a number of Resource Elements (REs) based on an offset value in the first table.

10. A User Equipment (UE), comprising:

a radio; and a processing circuit, the processing circuit being configured to multiplex a Low Priority (LP) Hybrid Automatic Repeat Request acknowledgment (HARQ-ACK) codebook and a High Priority (HP) HARQ-ACK codebook in a first Physical Uplink Shared Channel (PUSCH), the multiplexing comprising:

mapping the LP HARQ-ACK codebook from a first PUSCH symbol that does not include any Demodulation Reference Signal (DMRS) Resource Elements (REs); and mapping the HP HARQ-ACK codebook after a first symbol that follows a DMRS symbol and does not include any DMRS RES;

determining that the LP HARQ-ACK codebook has a payload with a size greater by n bits, than a first threshold; and dropping n bits of the payload of the LP HARQ-ACK codebook.

11. The UE of claim 10, wherein the processing circuit is further configured to:

determine that the LP HARQ-ACK codebook has a payload size less than the first threshold, the first threshold being T1 bits, T1 being an integer; and transmit a number of HARQ-ACK REs corresponding to T1 bits.

12. The UE of claim 11, wherein n being an integer.

13. The UE of claim 11, wherein the processing circuit is further configured to:

determine that the payload size is greater than T1 and less than a second threshold, the second threshold being T2 bits, T2 being an integer; and transmit a number of HARQ-ACK REs corresponding to T2 bits.

14. The UE of claim 10, wherein:

the first PUSCH is an HP PUSCH; and the processing circuit is further configured to receive, in a Downlink Control Information (DCI) scheduling the first PUSCH, a total Downlink Assignment Index (T-DAI) for the LP HARQ-ACK codebook.

15. The UE of claim 10, wherein:

the first PUSCH is an LP PUSCH; and the processing circuit is further configured to receive, in a Downlink Control Information (DCI) scheduling the first PUSCH, a total Downlink Assignment Index (T-DAI) for the HP HARQ-ACK codebook.

16. The UE of claim 10, wherein the LP HARQ-ACK codebook is a Type-2 HARQ-ACK codebook or an enhanced Type-2 HARQ-ACK codebook.

17. The UE of claim 10, wherein the processing circuit is further configured to:

select, from among a plurality of PUSCHs overlapping a first PUCCH, a second PUSCH, the second PUSCH having the same priority as the first PUCCH; and multiplex the first PUCCH in the second PUSCH.

18. A method comprising:

determining, by a User Equipment (UE), that a first channel uplink transmission and a second channel uplink transmission would overlap in time, the first channel uplink transmission associated with first Hybrid Automatic Repeat Request acknowledgment (HARQ-ACK) bits having a first priority and the second channel uplink transmission associated with second HARQ-ACK bits having a second priority;

determining a first number of Resource Elements (REs) to allocate to first HARQ-ACK bits and a second number of REs to allocate to the second HARQ-ACK bits, the second number of REs being dependent on the first number of REs;

multiplexing, by the UE, according to the first number of REs and the second number of REs, the first HARQ-ACK bits and the second HARQ-ACK bits in one of the first channel uplink transmission and the second channel uplink transmission, wherein the multiplexing comprises mapping the second HARQ-ACK bits from a first symbol of the second channel uplink transmission which does not include any Demodulation Reference Signal (DMRS) Resource Elements (REs), and mapping the first HARQ-ACK bits after a first symbol that follows a DMRS symbol and does not include any DMRS REs; and transmitting, by the UE, the one of the first channel uplink transmission and the second channel uplink transmission.

19. The method of claim 18, wherein the first priority is a higher priority than the second priority.

20. The method of claim 19, wherein the one of the first channel uplink transmission and the second channel uplink transmission is a Physical Uplink Shared Channel (PUSCH).

* * * * *